United States Patent
Revol et al.

(10) Patent No.: US 9,166,649 B2
(45) Date of Patent: Oct. 20, 2015

(54) METHOD OF DETECTING INTERFERENCE IN A SATELLITE RADIO-NAVIGATION SIGNAL BY DETECTING A DEFORMATION OF THE CORRELATION FUNCTION

(71) Applicant: THALES, Neuilly-sur-Seine (FR)

(72) Inventors: Marc Revol, Upie (FR); David Pietin, Le Haillan (FR)

(73) Assignee: Thales, Neuilly-sur-Seine (FR)

( * ) Notice: Subject to any disclaimer, the term of this patent is extended or adjusted under 35 U.S.C. 154(b) by 0 days.

(21) Appl. No.: 14/526,396

(22) Filed: Oct. 28, 2014

(65) Prior Publication Data

US 2015/0117500 A1    Apr. 30, 2015

(30) Foreign Application Priority Data

Oct. 31, 2013   (FR) ...................................... 13 02521

(51) Int. Cl.

| | |
|---|---|
| H04B 1/69 | (2011.01) |
| H04B 1/71 | (2011.01) |
| H04B 1/709 | (2011.01) |
| G01S 19/21 | (2010.01) |
| G01S 19/22 | (2010.01) |

(52) U.S. Cl.
CPC . *H04B 1/71* (2013.01); *G01S 19/21* (2013.01); *G01S 19/22* (2013.01); *H04B 1/709* (2013.01)

(58) Field of Classification Search
CPC ...... H04B 1/69; H04B 1/707; H04B 1/70712; H04B 1/7018; H04B 1/70724; H04B 1/7073; H04B 1/7075; H04B 1/70751; H04B 1/70752; H04B 1/70753; H04B 1/71

USPC ......... 375/130, 140, 141, 142, 143, 147, 148, 375/149, 150, 152
See application file for complete search history.

(56) References Cited

U.S. PATENT DOCUMENTS

| | | | | |
|---|---|---|---|---|
| 5,828,694 | A * | 10/1998 | Schipper | 375/150 |
| 6,448,925 | B1 * | 9/2002 | Shridhara | 342/357.59 |
| 6,987,820 | B1 * | 1/2006 | Brenner | 375/343 |
| 7,095,813 | B2 * | 8/2006 | Amerga et al. | 375/343 |
| 2001/0022807 | A1 * | 9/2001 | Yotsumoto | 375/147 |
| 2002/0186794 | A1 | 12/2002 | Oesch et al. | |
| 2003/0072356 | A1 * | 4/2003 | Abraham et al. | 375/148 |
| 2011/0309978 | A1 * | 12/2011 | Matsumoto | 342/357.77 |

OTHER PUBLICATIONS

Diego M. Franco-Patino et al.; Signal Quality Checks for Multipath Detection in GNSS; International Conference on Localization and GNSS; Jun. 25, 2013;Barcelona, Spain.
M. Irsigler et al.; Comparison of Multipath Mitigation Techniques with Consideration of Future Signal Structures; ION GPS/GNSS; Sep. 9-12, 2013; Portland, Oregon, USA.
Institute National De La Propeiete Industrielle; French Search Report; Jun. 25, 2014; Courbevoie, France.

* cited by examiner

*Primary Examiner* — Siu Lee
(74) *Attorney, Agent, or Firm* — Michael J. Donohue; Davis Wright Tremaine LLP

(57) ABSTRACT

A method of detecting interference in a satellite radio-navigation signal, calculates an item of information representative of the slope of the correlation function correlating the said signal with a local spreading code. The correlation function has substantially the theoretical form of an isosceles triangle, with the slope being estimated on any one of the equal-length sides of the isosceles triangle. The method further includes comparing the item of information with a detection threshold configured at least as a function of a target signal-to-noise ratio.

19 Claims, 2 Drawing Sheets

(12) United States Patent
US 9,166,649 B2

METHOD OF DETECTING INTERFERENCE IN A SATELLITE RADIO-NAVIGATION SIGNAL BY DETECTING A DEFORMATION OF THE CORRELATION FUNCTION

FIELD OF THE INVENTION

The present invention relates to the field of satellite radio-navigation systems and more precisely to satellite radio-navigation signals receivers.

The invention pertains to a method of detecting interference in a satellite radio-navigation signal received by such a receiver.

BACKGROUND OF THE INVENTION

When the radio-navigation signal is superimposed on a narrow-band interfering signal, this has the effect of engendering measurement errors which impact the time and position calculations performed by the receiver and ultimately give rise to a positioning error.

It is therefore important to be able to detect the presence of interference in the radio-navigation signal received so as to be able to undertake corrective processing or to exclude the measurements performed in the presence of interference.

The known solutions to the aforementioned problem are based on the detection of an aberrant measurement with respect to an average or an expected deviation.

These solutions exhibit the drawback of requiring too significant a detection time between the instant at which the interference occurs and the instant at which it is actually detected.

The invention proposes a method of detecting interference based on the evaluation of deformations of the correlation function of the radio-navigation signal.

The proposed method exhibits notably the advantage of allowing faster detection for narrow-band interference signals.

SUMMARY OF THE INVENTION

For this purpose, the subject of the invention is a method of detecting interference in a satellite radio-navigation signal, characterized in that it comprises the following steps:

Calculating an item of information representative of the slope of the correlation function correlating the said signal with a local spreading code, the said correlation function having substantially the theoretical form of an isosceles triangle, the said slope being estimated on any one of the equal-length sides of the said isosceles triangle; and Comparing the said item of information with a detection threshold configured at least as a function of a target signal-to-noise ratio.

According to a particular aspect of the invention, the said item of information representative of the slope is calculated at least on the basis of a first measurement of the maximum of the correlation function at a first temporal position, of a second measurement of the correlation function at a second temporal position advanced relative to the first temporal position by a smaller duration than the duration of a slot of the spreading code and of a third measurement of the correlation function at a third temporal position delayed relative to the first temporal position by a smaller duration than the duration of a slot of the spreading code.

According to a particular aspect of the invention, the time offset between the first measurement and the second measurement on the one hand and between the first measurement and the third measurement on the other hand are substantially equal in absolute value.

According to a particular aspect of the invention, the said item of information representative of the slope is calculated on the basis of the ratio of the energy of the first measurement to the sum of the respective energies of the second and third measurements.

According to a particular aspect of the invention, the said item of information representative of the slope is calculated on the basis of a number greater than three of measurements of the correlation function, taken according to various time abscissae, by performing a linear regression.

According to a particular aspect of the invention, the said item of information representative of the slope is calculated at least on the basis of the said time offset and of the length of a slot of the spreading code.

According to a particular aspect of the invention, the said detection threshold is configured as a function of the ratio of the powers of the signal and of the interference.

The subject of the invention is also a device for receiving satellite radio-navigation signals comprising means configured to implement the method of detecting interference according to the invention.

BRIEF DESCRIPTION OF THE DRAWINGS

Other characteristics and advantages of the present invention will be more apparent on reading the description which follows in relation to the appended drawings which represent.

MORE DETAILED DESCRIPTION

Figure 1:
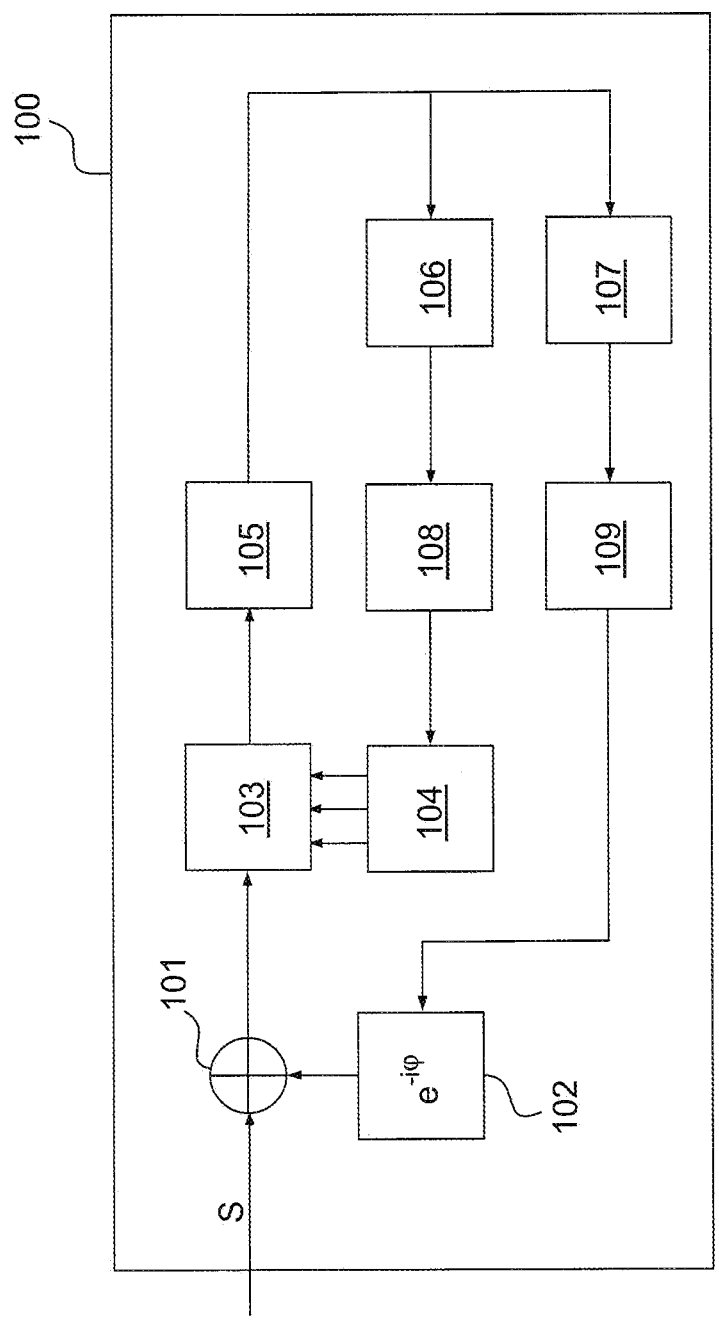
FIG. 1, a schematic of a radio-navigation signals reception device adapted for implementing the method according to the invention, FIG. 2a, a chart illustrating the theoretical form of the correlation function correlating the signal with a local spreading code in the absence of interference, FIG. 2b, a chart illustrating the impact of narrow-band interference on the form of the correlation function, FIG. 3, a flowchart describing the steps for implementing the method of detecting interference according to the invention.

FIG. 1 represents a schematic of a radio-navigation signals reception device adapted for implementing the method according to the invention.

Such a device 100 is based on a standard radio-navigation signals receiver which comprises notably the following functionalities. The received signal S is demodulated in phase by way of a demodulator 101 and of a local carrier 102. The demodulated signal S is thereafter transmitted to a correlator 103 so as to perform a correlation of the signal S with a locally generated spreading code 104. Advantageously, several correlations are carried out with different delays on each occasion. Typically, three correlations can be carried out, one at a given temporal instant, one advanced relative to this instant and the last delayed relative to this same instant.

The result of the correlations is provided to a module 105 for detecting interference according to the invention which executes a method described further on in the text.

The device 100 also comprises a code discriminator 106 and a digital control operator NCO 108 for steering the generation of the local code, in particular the temporal instant at which the main correlation is carried out.

The device 100 can also comprise a phase discriminator 107 and a digital control operator NCO 109 for steering the generation of the local carrier 102, stated otherwise the value of the phase shift to be imparted to the received signal S.

The device 100 according to the invention can comprise any other functionality customarily implemented in a satellite radio-navigation signals receiver. The elements described in FIG. 1 can also be replaced with any other equivalent function.

Figure 2A:
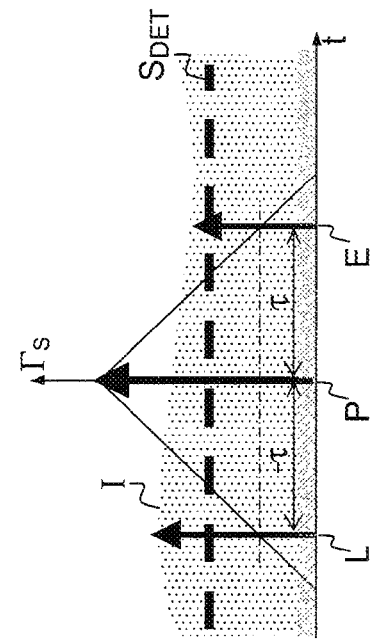

FIG. 2a represents, on a chart, the shape of the correlation function correlating the signal with the locally generated spreading code, as a function of the delay applied. In FIG. 2a are represented schematically three correlation points. The first point P corresponds to a correlation of the signal in phase with the local spreading code, stated otherwise which gives the maximum possible value of the correlation. The second point E corresponds to a correlation of the signal with the local spreading code advanced by a time offset T and the third point L corresponds to a correlation of the signal with the local spreading code delayed by a time offset T. These three correlation points are typically used in a satellite radio-navigation signals receiver to estimate the time offset between the signal received and the clock associated with the locally generated code. The advance and delay time offsets are smaller than the duration of a slot of the spreading code, better known by the acronym "chip".

In the absence of interference, the form of the correlation function corresponds substantially to an isosceles triangle as a function of the time offset (advance or delay) between the local code and the signal received.

Figure 2B:
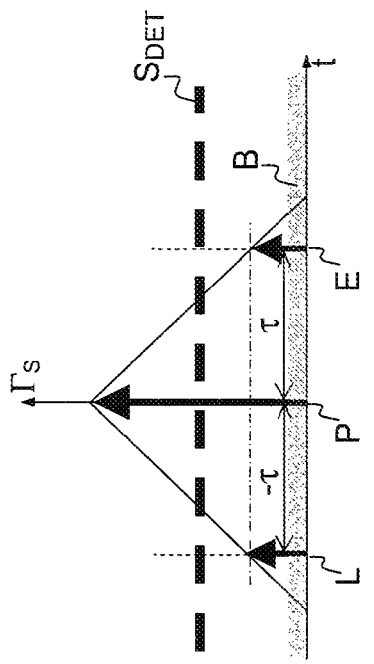

FIG. 2b represents the aforementioned three correlation points when a narrow-band interfering signal I is superimposed on the satellite radio-navigation signal.

In this case, the influence of the interfering signal may be such that the advance E and delay L correlation points are augmented and the in-phase correlation point P is attenuated. The form of the correlation function is then modified with respect to its theoretical form.

The principle underpinning the invention consists in detecting a deformation of the correlation function with respect to its theoretical triangular shape so as to deduce therefrom the presence of interference in the band of the received signal.

Figure 3:
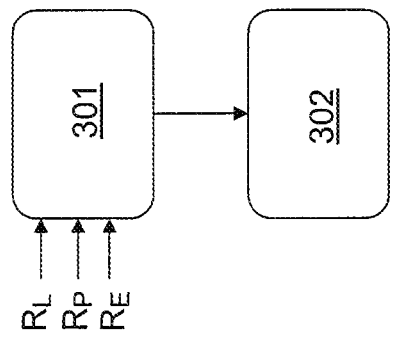

The method according to the invention comprises, as illustrated in the flowchart of FIG. 3, two main steps.

In a first step 301, an estimate of the slope of the theoretical correlation function on one of the two sides of the triangle (such as represented in FIG. 2a) is calculated on the basis of the results of the correlation of the signal received with the locally generated spreading code.

To calculate this estimate $\gamma$, the following relation may be used:

$$\gamma = \frac{R_P \cdot R_P^*}{R_E \cdot R_E^* + R_L \cdot R_L^*},$$

RP is the result of the main correlation, RP.RP* being equal to the instantaneous energy of this result.

RE is the result of the correlation with a positive delay of predetermined value $\tau$, the so-called advance (or early) correlation, RE.RE* being equal to the instantaneous energy of this result.

RL is the result of the correlation with a negative delay of predetermined value $-\tau$, the so-called delay (or late) correlation, RL.RL* being equal to the instantaneous energy of this result.

Advantageously, the absolute values of the positive delay and of the negative delay may be equal so that the advance and delay correlations are symmetric.

Thus, the value of the indicator $\gamma$ decreases when the power of the interfering signal is high.

To improve the precision of the indicator $\gamma$, the three correlation results can be averaged over a given duration K.

$$\gamma = \frac{\sum_{k=0}^{K} R_P(kT) \cdot R_P^*(kT)}{\sum_{k=0}^{K} R_E(kT) \cdot R_E^*(kT) + \sum_{k=0}^{K} R_L(kT) \cdot R_L^*(kT)}$$

The indicator $\gamma$ can further be improved by integrating a normalization factor which depends on the delay $\tau$ and on the duration rc of a slot of the spreading code:

$$\gamma = \frac{2}{\left(1 - \frac{\tau}{r_c}\right)^2} \cdot \frac{\sum_{k=0}^{K} R_P(kT) \cdot R_P^*(kT)}{\sum_{k=0}^{K} R_E(kT) \cdot R_E^*(kT) + \sum_{k=0}^{K} R_L(kT) \cdot R_L^*(kT)}$$

In a second step 302, the indicator $\gamma$ is compared with an interference detection threshold SDET configured as a function of a given signal-to-noise ratio and of a ratio of the powers of the useful signal and of the interfering signal. If the indicator $\gamma$ is smaller than the detection threshold SDET then the presence of interference is concluded.

The person skilled in the art will be able, without difficulty, to deduce from the indicators described hereinabove, other equivalent indicators which make it possible to estimate the slope of the correlation function or an item of information characteristic of this slope.

In particular, a number greater than 3 of correlation points can be used, with several different delays. The slope of the correlation function can be estimated on the basis of this plurality of correlation results by performing a linear regression.

In an equivalent manner, it is also possible to implement the inverse indicator $1/\gamma$ and to deduce therefrom the presence of interference when this inverse indicator is greater than a detection threshold.

In the various alternative embodiments of the device 100 according to the invention, the calculation modules can be arranged according to various architectures, in particular each step of the method according to the invention can be implemented by a distinct module or on the contrary the two steps can be grouped together within a unique calculation module.

Each of the calculation modules constituting the device according to the invention can be embodied in software and/or hardware form. Each module can notably consist of a processor and a memory. The processor can be a generic processor, a specific processor, an Application Specific Integrated Circuit (ASIC) or a Field-Programmable Gate Array (FPGA).

The invention claimed is:
1. Method, implemented by a radio-navigation signals receiver comprising a correlator and an interference detector, for detecting interference in a received satellite radio-navigation signal, comprising the steps of:

calculating, at the correlator, a correlation function correlating the received satellite radio-navigation signal with a local spreading code, the said correlation function having substantially a theoretical form of an isosceles triangle, calculating, at the interference detector, an item of information representative of a slope of the correlation function, the said slope being estimated on any one of the equal-length sides of the said isosceles triangle; and comparing, at the interference detector, the said item of information with a detection threshold configured at least as a function of a target signal-to-noise ratio and producing, from said comparison, an information on the presence or absence of interference in the received satellite radio-navigation signal to thereby improve performance of the receiver.

2. Method for detecting interference according to claim 1, in which the said item of information representative of the slope is calculated at least on a basis of a first measurement of the maximum of the correlation function at a first temporal position, of a second measurement of the correlation function at a second temporal position advanced relative to the first temporal position by a smaller duration than a duration of a slot of the spreading code and of a third measurement of the correlation function at a third temporal position delayed relative to the first temporal position by a smaller duration than the duration of a slot of the spreading code.

3. Method for detecting interference according to claim 2, in which a time offset between the first measurement and the second measurement and a time offset between the first measurement and the third measurement are substantially equal in absolute value.

4. Method for detecting interference according to claim 3, in which the said item of information representative of the slope is calculated on a basis of a ratio of the energy of the first measurement to a sum of the respective energies of the second and third measurements.

5. Method for detecting interference according to claim 2, in which the said item of information representative of the slope is calculated on a basis of a number greater than three of measurements of the correlation function, taken according to various time abscissae, by performing a linear regression.

6. Method for detecting interference according to claim 1, in which the said item of information representative of the slope is calculated at least on a basis of a time offset and of a length of a slot of the spreading code.

7. Method for detecting interference according to claim 1, in which the said detection threshold is configured as a function of a ratio of the powers of the signal and of the interference.

8. Method for detecting interference according to claim 1 comprising a step of receiving, at the radio-navigation signals receiver, a satellite radio-navigation signal.

9. Method for detecting interference according to claim 1 comprising a step of undertaking corrective processing to the satellite radio-navigation signal when a presence of interference in the received satellite radio-navigation signal is detected.

10. Method for detecting interference according to claim 1 comprising a step of excluding a measurement performed on a received satellite radio-navigation signal when a presence of interference in the received satellite radio-navigation signal is detected.

11. Device for receiving satellite radio-navigation signals comprising:

a correlator for calculating a correlation function correlating the received satellite radio-navigation signal with a local spreading code, the said correlation function having substantially a theoretical form of an isosceles triangle, an interference detector for calculating an item of information representative of a slope of a correlation, the said slope being estimated on any one of the equal-length sides of the said isosceles triangle; and the interference detector being further configured to compare the said item of information with a detection threshold configured at least as a function of a target signal-to-noise ratio and for producing, from said comparison, an information on the presence or absence of interference in the received satellite radio-navigation signal to thereby improve performance of the device.

12. Device for receiving satellite radio-navigation signals according to claim 11, in which the said item of information representative of the slope is calculated at least on a basis of a first measurement of the maximum of the correlation function at a first temporal position, of a second measurement of the correlation function at a second temporal position advanced relative to the first temporal position by a smaller duration than a duration of a slot of the spreading code and of a third measurement of the correlation function at a third temporal position delayed relative to the first temporal position by a smaller duration than the duration of a slot of the spreading code.

13. Device for receiving satellite radio-navigation signals according to claim 12, in which a time offset between the first measurement and the second measurement and a time offset between the first measurement and the third measurement are substantially equal in absolute value.

14. Device for receiving satellite radio-navigation signals according to claim 13, in which the said item of information representative of the slope is calculated on a basis of a ratio of the energy of the first measurement to a sum of the respective energies of the second and third measurements.

15. Device for receiving satellite radio-navigation signals according to claim 12, in which the said item of information representative of the slope is calculated on a basis of a number greater than three of measurements of the correlation function, taken according to various time abscissae, by performing a linear regression.

16. Device for receiving satellite radio-navigation signals according to claim 11, in which the said item of information representative of the slope is calculated at least on a basis of a time offset and of a length of a slot of the spreading code.

17. Device for receiving satellite radio-navigation signals according to claim 11, in which the said detection threshold is configured as a function of a ratio of the powers of the signal and of the interference.

18. Device for receiving satellite radio-navigation signals according to claim 11, said device being configured to undertake corrective processing to the satellite radio navigation signal when a presence of interference in the received satellite radio-navigation signal is detected.

19. Device for receiving satellite radio-navigation signals according to claim 11, said device being configured to exclude a measurement performed on a received satellite radio-navigation signal when a presence of interference in the received satellite radio-navigation signal is detected.

* * * * *